United States Patent [19]

Harriott

[11] 4,440,269

[45] Apr. 3, 1984

[54] SELF ADJUSTING PARKING BRAKE

[75] Inventor: Paul J. Harriott, Ithaca, N.Y.

[73] Assignee: General Motors Corporation, Detroit, Mich.

[21] Appl. No.: 395,144

[22] Filed: Jul. 6, 1982

[51] Int. Cl.³ ...................... F16D 65/38; F16D 51/04
[52] U.S. Cl. .......................... 188/196 F; 188/196 B; 188/79.5 K
[58] Field of Search ......... 188/196 F, 196 B, 196 BA, 188/196 M, 196 R, 196 P, 79.5 K, 79.5 R; 192/111 A; 74/501.5 R

[56] References Cited

U.S. PATENT DOCUMENTS 3,220,516  11/1965  Swift ........................... 188/196 BA
3,648,813  3/1972  Walters et al. ................. 192/111 A
4,379,500  4/1983  Kamino ........................... 188/196 B Primary Examiner—Bruce H. Stoner, Jr.
Assistant Examiner—Robert J. Oberleitner
Attorney, Agent, or Firm—D. D. McGraw

[57] ABSTRACT

The parking brake cable is loaded and then maintained at a substantially constant tension force existing while the parking brake is not applied. This tension force maintains the parking brake in adjustment, permitting initiation of parking brake application with an increase in cable tension force which minimizes lost movement of the parking brake control mechanism to move the brake shoes into friction contact with friction braking surfaces.

5 Claims, 14 Drawing Figures

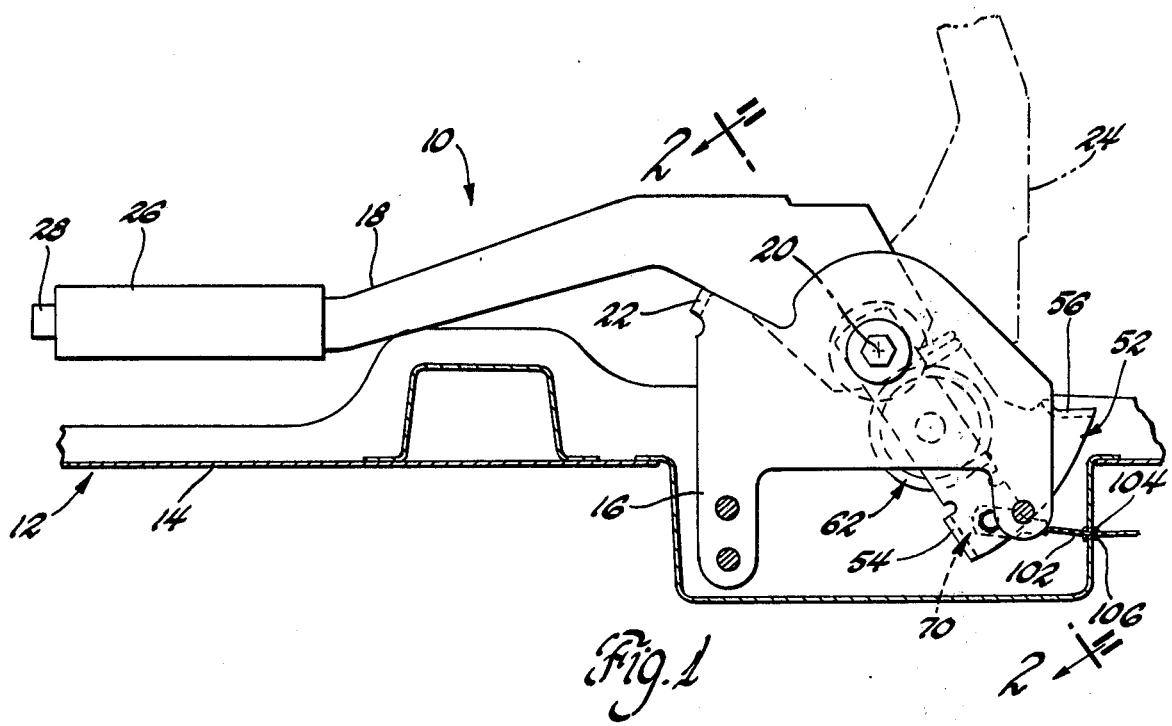
Fig. 1
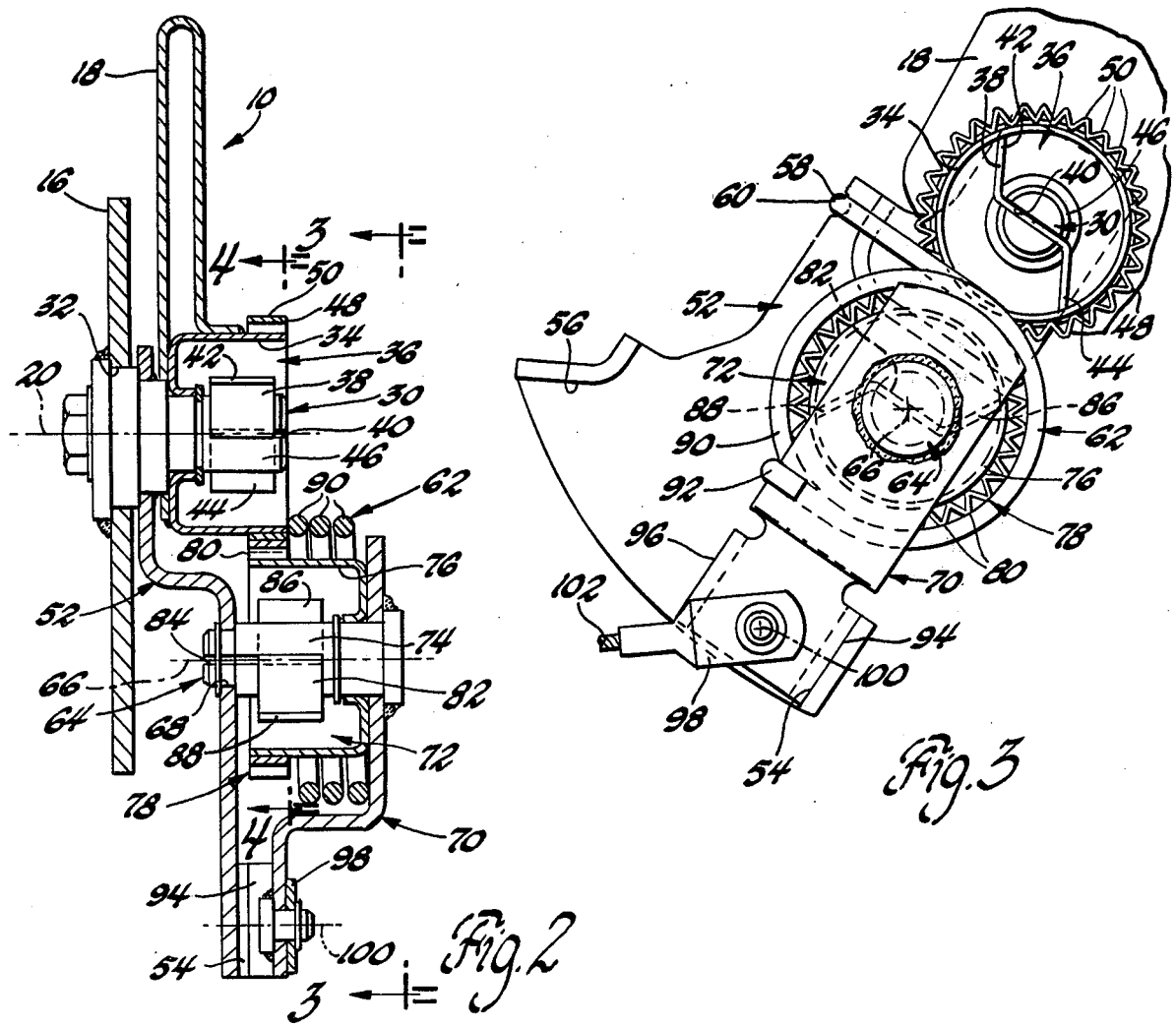
Fig. 2
Fig. 3

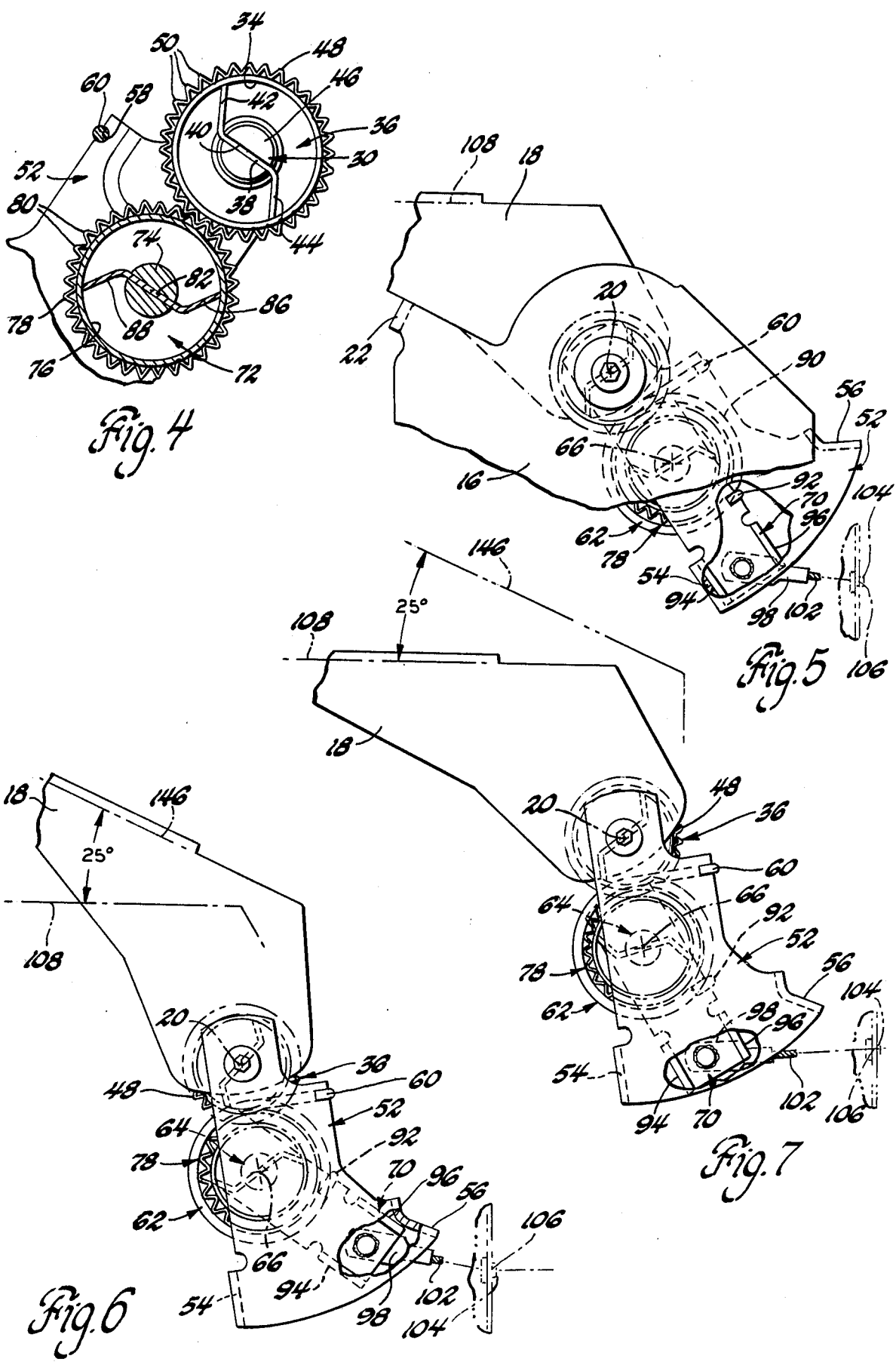

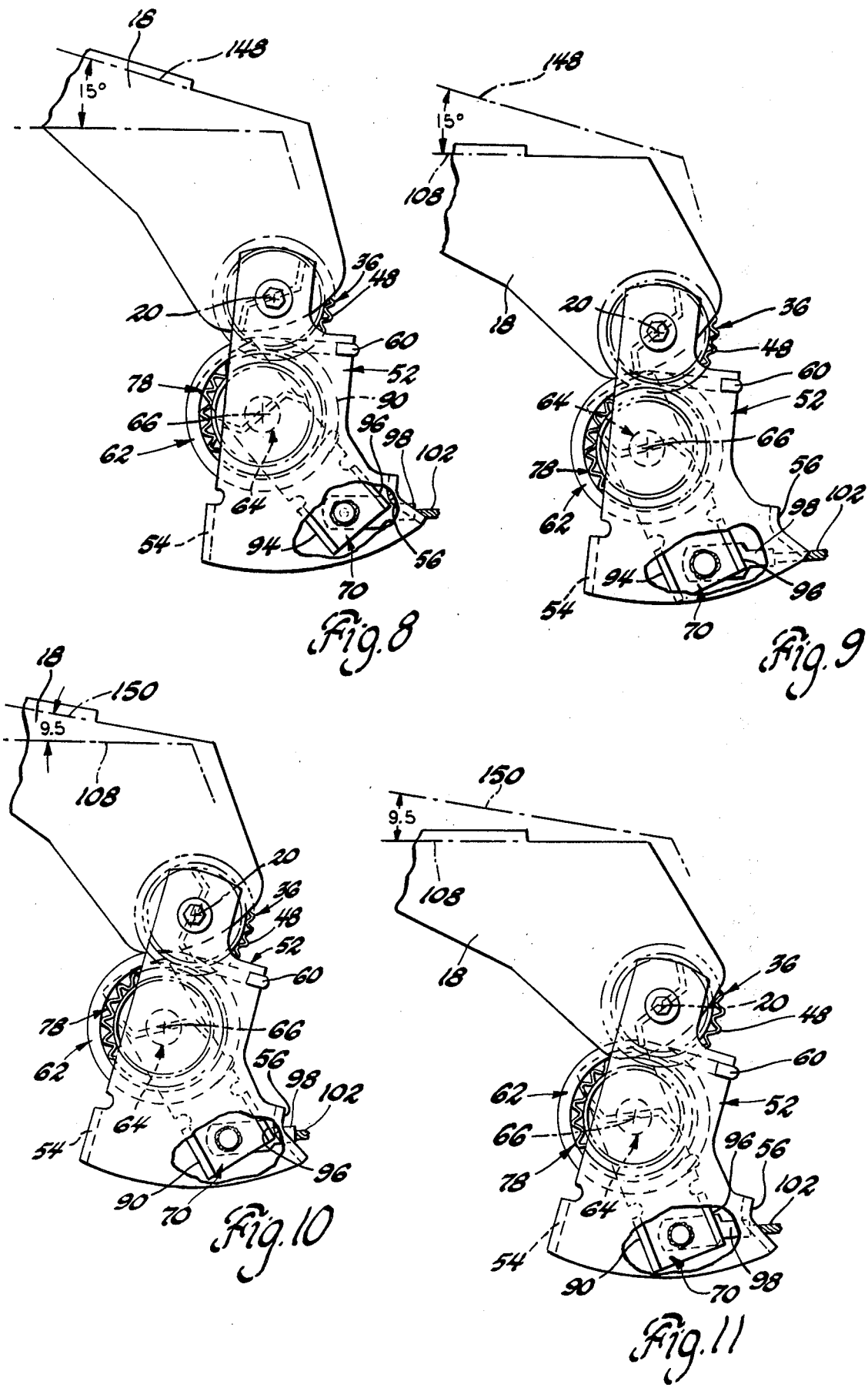

SELF ADJUSTING PARKING BRAKE

The invention relates to a parking brake control mechanism which automatically adjusts the parking brake apply cable tension to a predetermined value with the parking brake released. This is accomplished by applying tensile force to the parking brake cable in increments until the desired tension is achieved. When the parking brake control mechanism is actuated to apply the parking brake, the tension in the cable is increased. The desired residual tension force in the fully adjusted mechanism is approximately 200 Newtons. Since it requires about 315 Newtons of tension force to overcome the retraction springs in a typical drum brake, the residual tension alone is insufficient to move the shoes outwardly to engage the brake drum. However, the shoes are moved outwardly to some extent so that only a small additional force, and therefore a small stroke of the parking brake apply handle, need be applied to engage the shoes with the drum. Any particular installation design is tailored to the specifications of the parking brakes and friction losses in the actuating system. Therefore, the above mentioned force figures are only representative.

IN THE DRAWINGS

FIG. 1 is an elevation view, with parts broken away and in section, of a parking brake control mechanism embodying the invention.

FIG. 2 is a cross-section view of the mechanism of FIG. 1 taken in the direction of arrows 2—2 of that Figure.

FIG. 3 is an elevation view, with parts broken away, of a portion of the mechanism of FIGS. 1 and 2, taken in the direction of arrows 3—3 of FIG. 2.

FIG. 4 is a fragmentary view of parts of the mechanism, with parts broken away and in section, taken in the direction of arrows 4—4 of FIG. 2.

FIGS. 5 through 12 illustrate the operational sequence of the control mechanism, with parts broken away, and viewed in elevation from the same perspective as the elevation view of FIG. 1.

Figure 12:
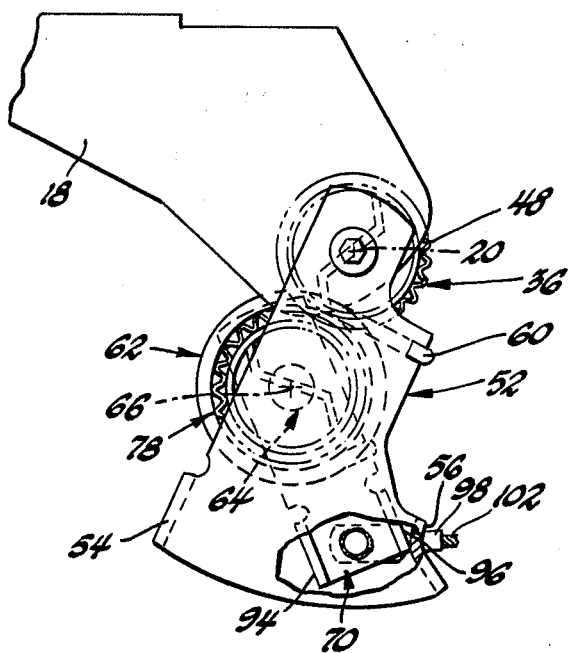

The condition of the mechanism illustrated in FIGS. 1 and 5 show the control system as it is installed in the motor vehicle before the control system is adjusted. FIGS. 6 through 11 show the control system adjusting mechanism during each of the first three strokes required for adjustment. A fourth stroke is not illustrated but is required, as shown on the graphs and as discussed below, to attain the desired cable tension. FIG. 12 shows the adjusting mechanism in the fully adjusted position with the desired tension force of approximately 200 Newtons exerted on the parking brake cable with the parking brake released.

The parking brake control mechanism 10 of FIG. 1 is preferably located on one side of the driver's seat and is so arranged that in the rest position shown the mechanism is below the level of the seat sitting surface. The control mechanism 10 is installed in a vehicle 12 by being fixed to a suitable portion of the vehicle body 14. The control mechanism includes a fixed mounting member 16 on which the control lever 18 is pivotally mounted to pivot about an axis 20. A projection forming a stop 22 on mounting member 16 is engaged by the lever 18 to define the released or stored position of lever 18. The lever 18 is pivotable about axis 20 for approximately 90°, the fully applied position 24 of the lever being illustrated in phantom lines. Lever 18 is provided with a suitable handle 26 and a release button 28. The release button controls a suitable toothed ratched mechanism not shown, which may hold the lever 18 in the desired arcuately applied position, in a manner well known in the art. A pivot pin 30 is mounted for rotation in an opening 32 formed in the fixed mounting member 16. Axis 20 is the axis of rotation of pin 30. Suitable arrangements for axially securing the pivot pin 30 to mounting member 16 are provided.

As is better seen in FIG. 2, lever 18 is attached to the outer race 34 of a one-way clutch mechanism 36. Clutch mechanism 36 includes a sprague arrangement better illustrated in FIGS. 3 and 4. This arrangement is a substantially S-shaped leaf spring 38 fitting within a slot 40 formed in a part of pivot pin 30 so that the spring ends 42 and 44 engage the outer race 34 at an angle which allows the outer race to rotate in one direction relative to the inner race 46, formed as the part of pin 30 through which slot 40 extends, but prevents relative rotation in the opposite direction. Therefore, as seen in FIGS. 3 and 4, the outer race 34 may rotate clockwise relative to the inner race 46, but not counterclockwise. In FIGS. 5 through 12, the outer race 34 may rotate counterclockwise relative to the inner race 46, but not clockwise. This is because the view of each of these latter Figures is taken from the opposite side of the control mechanism 10 from the view of each of FIGS. 3 and 4. A gear 48, formed by a circumferentially extending series of gear teeth 50, is externally provided on the outer race 34 so that the gear rotates with the outer race. Some of the gear teeth 50 are always meshed with some teeth of another gear to be described.

A link 52 is attached to pivot pin 30 to pivot therewith about axis 20. Link 52 is provided with abutments defining a low stop 54 and a high stop 56. A notch 58 is formed in one edge of link 52 and receives one end 60 of a torsion spring 62 which will be further described.

Another pivot pin 64 is mounted to pivot on an axis 66 extending through an opening 68 formed in link 52. Axis 66 is parallel to and transversly spaced from axis 20. Pin 64 is mounted for rotation within opening 68 relative to link 52 and is secured therein against axial movement. An adjusting lever or link 70 is secured to pin 64 so as to be rotatable therewith about axis 66. Another one-way clutch mechanism 72 is provided and includes a portion of pin 64 as its inner race 74. Clutch mechanism 72 has an outer race 76 rotatably mounted on pin 64 so that it can rotate about axis 66 relative to pin 64 and adjusting lever 70. A gear 78, formed by a circumferentially arranged series of gear teeth 80, is secured to the outer surface of outer race 76. Some of the gear teeth are in meshed relation with some of the gear teeth 50 of gear teeth 48. The sprague formed by substantially S-shaped spring 82 is secured through a slot 84 formed in pin 66 and has its outer ends 86 and 88 engaging the inner surface of the clutch outer race 76. The angle of engagement of the spring outer ends is such that the outer race 76 may move counterclockwise relative to the inner race 74, as seen in FIGS. 3 and 4, but cannot move clockwise relative thereto. Therefore, as viewed in FIGS. 5 through 12, the outer race 76 can move clockwise relative to the inner race 74, but not counterclockwise.

As is best seen in FIGS. 2 and 3, several coils 90 of torsion spring 62 are positioned radially outward of outer race 36 and axially between the gear teeth 50, 80 and parts of the adjusting lever 70. The other end 92 of torsion spring 62 is hooked over the adjusting lever 70 in a notch formed in an edge of that lever so that when the spring has a torsional tension force therein it tends to urge the adjusting lever counterclockwise as seen in FIGS. 3 and 4, which is clockwise as seen in FIGS. 1 and 5 through 12.

The adjusting lever 70 is so positioned that one edge 94 can engage the low stop 54 and the other edge 96 can engage the high stop 56. The stops therefore define the arcuate limits of movement of adjusting lever 70 relative to link 52. In the particular arrangement herein disclosed and described, this movement is an arc of 45°. A cable clevis or the like 98 is pivotally attached to the adjusting lever 70 at pivot point 100 on an axis spaced transversly from axes 20 and 66. It is on the generally opposite side of axis 66 from axis 20. The parking brake cable 102 is suitably secured to clevis 98 and passes through a guide 104 positioned in a suitable portion of the vehicle body 14. The cable has a guide point 106 located in the plane of that portion of the body so that the cable is movable axially within the guide 104. Cable 102 leads to the vehicle wheel brakes, having parking brakes incorporated therein. They may be the rear or front wheel brakes. Cable 102 is suitably connected to those brakes to actuate the parking brake mechanism therein as the cable is tensioned and moved forwardly through the guide 104.

FIG. 5 shows the mechanism in the position as it is installed in the vehicle before any particular adjustment has been made. The vehicle brakes are released. The actuator control lever 18 is substantially horizontal, being in the normal stored position established by engagement with stop 22. The dashed line 108 is a reference line for this substantially horizontal position. Assuming that the cable 102 has some initial tension on it, that initial tension will be equal to the tension of torsion spring 62. The torsion spring 62 holds the adjusting lever 70 so that its edge 94 engages the low stop 54 formed on link 52. The adjusting lever 70 is therefore positioned at its clockwise limit relative to link 52.

The following description of the movements of the control lever 18, such movements also being referred to as parking brake handle movements, are expressed in terms of degrees of arc and are the amounts required for adjustment without applying the parking brake. Should any stroke first portion of movement of the control lever 18 exceed the prescribed arc, sufficient tension force will be applied to the parking brake cable 102 to tend to achieve some parking brake actuation even though the mechanism has not yet been fully adjusted. However, upon movement of the control lever back to the position indicated by dashed line 108, the second portion of the stroke will begin to take place at the time that the control lever 18 reenters the prescribed adjusting movement arc.

Figure 13:
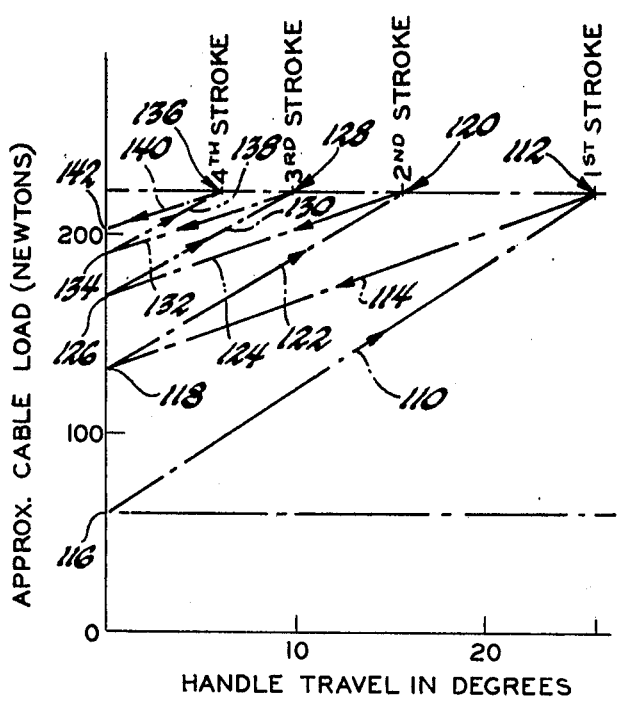
FIG. 13 is a graph illustrating the adjustment of the control mechanism through several sequential strokes, plotting the control mechanism handle travel against the tension load in the parking brake cable.
Figure 14:
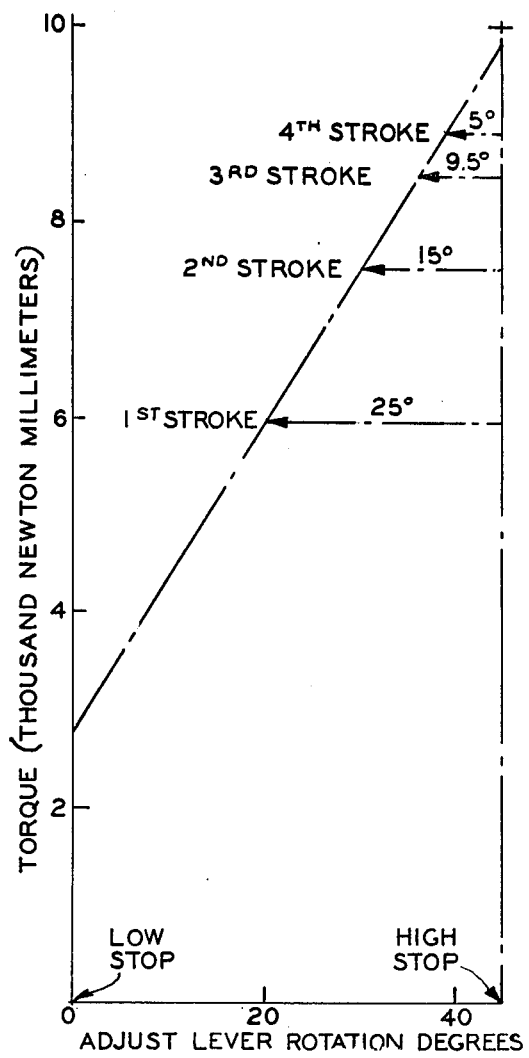
FIG. 14 is a graph illustrating the adjustment of the control mechansim through several sequential strokes, plotting the adjusting lever rotation against the torque exerted on the adjusting lever spring.

In the graph of FIG. 13, line 110 represents the first half of first stroke 112, and line 114 represents the second half of that stroke. Thus the stroke is represented as beginning at point 116 and being completed at point 118. In a similar fashion, the second stroke 120 begins at point 118, with the first portion of the second stroke being represented by line 122, the second portion of the second stroke being represented by line 124, and the second stroke being completed at point 126. The third stroke 128 begins at point 126 with line 130 representing the first portion of the third stroke and line 132 representing the second portion of the third stroke. The third stroke is completed at point 134. The fourth stroke 136 begins at point 134, with the first portion of that stroke being represented by line 138 and the second portion of that stroke being represented by line 140. The fourth stroke is completed at point 142, which represents the approximate desired cable load on the parking brake cable 102 during the released position of the parking brake, with the mechanism being fully adjusted. In FIG. 14, the four strokes are illustrated in terms of degrees of rotation of the adjuster lever about its axis 66 relative to link 52, plotted against the torque exerted on the adjusting lever. This shows the spring rate of spring 62, with the left margin representing the low stop 54, the right margin representing the high stop 56, and the dashed lines representing the degrees of adjusting lever return on each stroke.

FIG. 6 illustrates the action occurring at the completion of the first portion 110 of the first adjusting stroke 112 of the mechanism. As illustrated, control lever 18 is moved from the stored position, represented by line 108, clockwise through a 25° arc to a position represented by line 146. The 25° clockwise movement of lever 18 drives link 52 and axis 66 clockwise about axis 20 from the position shown in FIG. 5. This also tends to move adjusting lever 70 with link 52 clockwise about axis 20 for 25° of arc. However, cable 102 is being tensioned so that the adjusting lever 70 must pivot counterclockwise about axis 66, adding tension to torsion spring 62. This action is permitted because the inner race 74 of the one-way clutch 72 may move counterclockwise relative to the outer race 76. Outer race 76 is locked against movement about axis 66 by the meshed condition of gears 48 and 78 and the locked condition of one-way clutch 36. The increased tension in cable 102 is opposed by the increasing torsion force in spring 62, the spring being wound up as the cable tension increases. The torsion force absorbed by spring 62 continues to increase until the side 96 of adjusting lever 70 engages the high stop 56. The adjusting lever 70 has moved counterclockwise about axis 66 through the 45° arc on link 52 permitted by stops 54 and 56. This first portion of the first stroke is graphically illustrated in FIG. 13 wherein the 25°'s of control lever travel has resulted in the application of about 222 Newtons of cable load.

The second portion 114 of the first stroke 112 is illustrated in FIG. 7. It involves a return of the control lever 18 to the stored position represented by line 108. This movement of the control lever through a 25° arc in the counterclockwise direction is shown in FIG. 7. This movement moves the outer race 34 of clutch 36 in the counterclockwise direction with sprague spring 38 permitting such movement relative to the inner race 46. Torsion spring 62 drives the adjusting lever 70 clockwise about axis 66, with the force exerted by the spring 62 on the lever 70 going through the locked clutch 72 to rotate gear 78 clockwise, making gear 78 "walk around" gear 48 while gear 48, being on the outer race 34, rotates counterclockwise with control lever 18. Spring 62 maintains tension on the adjusting lever 70 relative to link 52 so that the adjusting lever advances clockwise 25° about axis 66 to the position illustrated in FIG. 7. This rotation of the adjusting lever is shown in FIG. 14. The torque on spring 62 is approximately 6000 Newtons. When this position is attained, the spring tension in spring 62 and the tension in cable 102 are balanced with the cable having been moved part of the way towards a parking brake applied position. It is recognized that this analysis presents a somewhat simplified explanation of the movement during the first stroke by assuming that the cable 102 does not travel to any extent during the first portion of the stroke, but travels only during the second stroke portion. Actually, cable 102, and particularly the pivot point 100, will move as it is tensioned, with the result at the completion of the first stroke being the result described. The analysis also assumes that link 52 does not move during the second stroke portion as gear 78 is moved arcuately. At the completion of the first stroke, the control lever having been returned to the horizontal position, the balancing force acting on the adjusting lever 70 and exerted by spring tension in spring 62 opposed by tension in cable 102 is approximately 135 Newtons as indicated by point 118 in the graph of FIG. 13.

FIGS. 8 and 9 represent the first and second portions of the second stroke 120. In the first portion of the second stroke, control lever 18 is moved arcuately 15° clockwise about axis 20 to the position indicated by line 148, and in the second portion of the second stroke it is returned from that position to the position indicated by line 108. The cycle is repeated in the manner above described, the adjusting lever 70 at the completion of the second stroke having moved an additional 15° about axis 66 relative to link 52, thus further tensioning cable 102.

FIGS. 10 and 11 represent the first and second portions of the third stroke, the control lever 18 being first moved 9.5° clockwise to the position represented by line 150, and then being returned 9.5° counterclockwise to the position represented by line 108. The mechanism again cycles in the manner above described with the result that the adjusting lever 70 moves an additional 9.5° counterclockwise relative to link 52 and about axis 66 at the completion of the stroke.

A fourth stroke, not illustrated other than on the graphs of FIGS. 13 and 14, is repeated at an angle of 5° of arc. At the completion of the fourth stroke 136, the final adjusted position is achieved and balanced torsion spring and parking brake cable tensions are about 220 Newtons, which is the desired value for the particular mechanism illustrated.

As the brake shoes wear, the mechanism will adjust further as necessary to maintain the adjusted tension force of about 222 Newtons, following a cycle along the lines of those described above. In the fully adjusted position shown in FIG. 12, it can be seen that any clockwise movement of control lever 18 results in the same clockwise movement of link 52 about axis 20. The high stop 56, being in engagement with adjusting lever 70, drives the adjusting lever as a unit with levers 18 and 52, tensioning cable 102 to the desired extent for parking brake application. An appropriate locking ratchet mechanism can hold control lever 18 in the applied position and is released by operation of button 28 to permit return of lever 18 to the horizontal position represented by line 108.

The embodiments of the invention in which an exclusive property or privilege is claimed are defined as follows:

1. In a vehicle parking brake control mechanism for actuating a parking brake by force applied through a force transmitting member:
   first means including a force storage and dispensing device, said first means being operable to store and maintain a predetermined minimum force in said device and through said device establish and maintain the same predetermined minimum force on said force transmitting member, said predetermined minimum force value being less than the minimum force required to be applied through said force transmitting member to initiate braking action by the parking brake but being sufficient to keep the parking brake in an adjusted but inactive braking condition, incipient to the initiation of braking action, as the parking brake is worn;
   and second means including said first means other than said device, said second means when actuated acting to deliver additional force beyond said predetermined minimum force to said force transmitting member to initiate and increase braking action by the parking brake to the desired extent;
   said device dispensing stored force as needed to maintain said predetermined minimum force on said force transmitting member after parking brake wear has occurred so as to require adjustment thereof, and having the dispensed force replaced in storage in said device when said first means is next operated in the brake actuating direction.

2. A self-adjusting vehicle brake actuating mechanism comprising:
   a brake actuating and release control member operable by the vehicle operator;
   a brake actuator operable by said control member to actuate and release a vehicle brake;
   a spring and one-way clutch means between said control member and said brake actuator operable, in response to initial movements of said control member in the brake actuating direction, to establish a static energy level in said spring for said brake actuator commensurate with a desired vehicle brake adjustment, said spring and one-way clutch means thereafter being responsive to brake actuating direction movement of said control member to reestablish said static energy level to compensate for wear in said vehicle brake tending to decrease said static energy level in said spring, whereby said static energy level and thus the desired vehicle brake adjustment is maintained for the life of said vehicle brake.

3. A self-adjusting vehicle brake actuating mechanism comprising:
   a brake actuating and release control member operable by the vehicle operator;
   a brake actuator operatively operated by said control member to actuate and release a vehicle brake;
   a spring and one-way clutch means between said control member and said brake actuator adapted, in response to initial brake actuating direction movement of said control member, to establish and then maintain a static energy level in said spring and said brake actuator commensurate with the maintenance of a desired vehicle brake adjustment, said spring and one-way clutch means thereafter being responsive to brake actuating direction movement of said control member to maintain said static energy level to compensate for brake wear which otherwise would result in a decrease in said energy level.

4. In a vehicle parking brake apply and release and parking brake adjustment control mechanism for the vehicle parking brake:
   a first pivot axis which is adapted to be fixed to a part of a vehicle body;
   a first link mounted on said first pivot axis and arcuately movable thereabout;
   a second pivot axis mounted on said first link in laterally spaced relation to said first pivot axis and arcuately movable about said first pivot axis with said first link;
   a second link mounted on said second pivot axis and arcuately movable thereabout through a predetermined restrictive arc relative to said first link;
   a tensionable parking brake actuating cable having one end operatively secured to said second link for the application of tension force thereto by movement of said second link;
   first and second clutch means each having an input member and an output member relatively freely movable only in one arcuate direction, the clutch means input members being drivingly connected, the first clutch means output member being mounted for movement about said first pivot axis and the second clutch means output member being mounted for movement about said second pivot axis;
   a vehicle operator-operable input lever operatively secured to said first clutch means input member for arcuate movements about said first pivot axis;
   and spring means acting between said first and second links to store force to a predetermined stored force limit as said second link is moved arcuately in one direction about said second pivot axis while the tension force on said cable is being increased to a desired value for parking brake adjustment corresponding to the predetermined stored force limit;
   said mechanism being operable to achieve the desired cable tension force value by apply and release movements of said input lever and being operable to move all parts of said clutch means and said first and second links arcuately about said first pivot axis to apply additional tension force to said cable to actuate the vehicle parking brake.

5. In a vehicle parking brake actuating and release and adjustment control arrangement having a vehicle parking brake, a cable for operating the parking brake by the amount of tension force applied to the cable, and a control mechanism for controlling the amount of tension force applied to the cable, said control mechanism comprising:
   a fixed mounting member;
   an input control lever pivotally mounted on said fixed mounting member for limited arcuate movements about a fixed first axis;
   a link having one end pivotally mounted on said fixed mounting member for limited arcuate movements about said fixed first axis;
   a first one-way clutch connecting said lever and said link at said fixed first axis so that said first one-way clutch is locked to drive said link by said lever when said lever is moved arcuately in a first arcuate direction commensurate with increasing tension force in said cable;
   a second axis on said link parallel to and laterally spaced from said fixed first axis;
   an adjusting lever having one end pivotally mounted on said link for limited arcuate movements about said second axis and the other end operatively connected to said cable, said link having arcuately spaced first and second positive stops arranged for engagement by said adjusting lever to define the limits of arcuate movement of said adjusting lever about said second axis;
   a torsion spring acting on said link and said adjusting lever and continually arcuately urging said adjusting lever toward engagement with said first stop and having a predetermined tension force stored therein and exerted on said adjusting lever when said adjusting lever is moved about said second axis to engage, and maintain engagement with said second stop, said predetermined tension force being that value desired to be maintained on said cable with the parking brake released to keep the parking brake in a desired condition of adjustment;
   and a second one-way clutch operatively connecting said adjusting lever at said second axis and also connecting said first one-way clutch, said connection between said one-way clutches being first and second meshed gears respectively rotatably mounted for rotary movements about said fixed first axis and said second axis, said input control lever being operatively secured to said first gear for rotation therewith about said fixed first axis as either said input control lever or said first gear is caused to be moved arcuately about said fixed first axis, said second one-way clutch being arranged to permit free arcuate movement of said adjusting lever about said second axis in an arcuate direction away from said first stop toward said second stop and to drive by acting through said meshed gears said input control lever through arcuate movement of said adjuster lever from said second stop toward said first stop by said torsion force stored in said spring.

* * * * *